(12) United States Patent  
Liu

(10) Patent No.: US 8,989,385 B2  
(45) Date of Patent: Mar. 24, 2015

(54) DATA ENCRYPTION METHOD, DATA VERIFICATION METHOD AND ELECTRONIC APPARATUS

(75) Inventor: Wen-Xiu Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 206 days.

(21) Appl. No.: 13/542,672

(22) Filed: Jul. 6, 2012

(65) Prior Publication Data

US 2013/0315394 A1   Nov. 28, 2013

(30) Foreign Application Priority Data

May 25, 2012  (CN) .......................... 2012 1 0167690

(51) Int. Cl.
| | |
|---|---|
| *H04L 9/00* | (2006.01) |
| *H04L 29/06* | (2006.01) |
| *H04L 9/08* | (2006.01) |
| *H04L 9/28* | (2006.01) |

(52) U.S. Cl.  
CPC ............ *H04L 63/123* (2013.01); *H04L 9/0816* (2013.01); *H04L 9/28* (2013.01)  
USPC ......................................................... 380/277

(58) Field of Classification Search  
CPC ........... H04L 9/32; H04L 9/3228; H04L 9/28; H04L 9/20; H04L 9/22; H04L 63/123; H04L 9/0816  
USPC ........................................................... 380/277  
See application file for complete search history.

(56) References Cited

U.S. PATENT DOCUMENTS

| | | | |
|---|---|---|---|
| 5,214,703 A * | 5/1993 | Massey et al. ................... 380/37 |
| 5,623,548 A * | 4/1997 | Akiyama et al. ................. 380/28 |
| 6,823,488 B1 * | 11/2004 | Heegard et al. ............... 714/786 |
| 7,508,945 B1 * | 3/2009 | Herrero ......................... 380/268 |
| 2004/0247127 A1* | 12/2004 | Rose ............................ 380/274 |
| 2005/0193206 A1* | 9/2005 | Kunisa et al. ................. 713/176 |
| 2006/0137025 A1* | 6/2006 | Lagrange et al. ............... 726/27 |
| 2007/0033141 A1* | 2/2007 | Higurashi ....................... 705/50 |
| 2007/0283427 A1* | 12/2007 | Gupta et al. ...................... 726/9 |
| 2008/0107260 A1* | 5/2008 | Duval ............................ 380/28 |
| 2008/0199005 A1* | 8/2008 | Tsukazaki ...................... 380/44 |
| 2012/0036355 A1* | 2/2012 | Jang et al. ..................... 713/160 |
| 2012/0102323 A1* | 4/2012 | Lin et al. ....................... 713/168 |
| 2012/0210115 A1* | 8/2012 | Park et al. ........................ 713/2 |
| 2013/0011006 A1* | 1/2013 | Petrovic et al. ............... 382/100 |

* cited by examiner

*Primary Examiner* — Matthew Smithers  
*Assistant Examiner* — Jing Sims  
(74) *Attorney, Agent, or Firm* — Jianq Chyun IP Office

(57) ABSTRACT

A data encryption method, a data verification method and an electronic apparatus are provided. An encryption key is obtained from original data according to a random sequence so as to transform the original data into replace data by using the encryption key, and the replace data is encrypted to obtain a ciphertext. Accordingly, when verification data is received, if the verification data is not conform with the original data, the verification process will not be successful.

13 Claims, 8 Drawing Sheets

DATA ENCRYPTION METHOD, DATA VERIFICATION METHOD AND ELECTRONIC APPARATUS

CROSS-REFERENCE TO RELATED APPLICATION

This application claims the priority benefit of China application serial no. 201210167690.0, filed on May 25, 2012. The entirety of the above-mentioned patent application is hereby incorporated by reference herein and made a part of this specification.

BACKGROUND

1. Technical Field

The invention relates to a security protocol. Particularly, the invention relates to a data encryption method, a data verification method and an electronic apparatus.

2. Related Art

A main encryption technique includes an asymmetric-key algorithm and a symmetric-key algorithm, where the asymmetric-key algorithm is also referred to as a public-key cryptography, which includes message-digest algorithm 5 (MD5), RSA, etc., and the asymmetric-key algorithm includes data encryption standard (DES), an international data encryption algorithm (IDEA), and an advanced encryption standard (AES), etc.

A deciphering party (for example, a network service provider) probably masters the encryption and decryption technique, and can directly decipher data after obtaining a ciphertext. Although it can prevent the direct deciphering in a certain degree by using a public key, a private key or a single key (probably having a random sequence) to encrypt and decrypt data, preserving security of the key cannot be guaranteed, which can be a threat for the user's data.

In order to avoid the problem on key security, ordinary two-way encryption is applied, i.e. a key (probably having a random sequence) is used to encrypt data to generate a ciphertext, though the key is preserved nowhere, for example, in the asymmetric-key algorithm, the public key is used to encrypt data into the ciphertext, and the private key is preserved nowhere and is directly encrypted with the ciphertext to generate a final ciphertext. Regarding encryption of the symmetric-key algorithm, after the single key is encrypted, the encrypted single key is again encrypted with the ciphertext. According to such method, once a decryption algorithm is leaked, the key can be easily obtained through deciphering, so that it is still insecure in some degree.

SUMMARY

The invention is directed to a data encryption method, by which an encryption key is obtained from original data, and a ciphertext is unable to be successfully deciphered without the original data.

The invention is directed to a data verification method, by which only when verification data and original data are conformed, decryption data the same to the verification data is obtained from a ciphertext.

The invention is directed to an electronic apparatus, in which an encryption key is ameliorated to be randomly correlated with original data, so as to enhance reliability and security of a ciphertext.

The invention provides a data encryption method, which is adapted to an electronic apparatus. According to the method, original data is received, and an encryption key is obtained from the original data according to a random sequence. Moreover, the original data is transformed into replacing data by using the encryption key. Then, and the replacing data is encrypted to obtain a ciphertext.

In an embodiment of the invention, in the step of obtaining the encryption key from the original data according to the random sequence, a plurality of random numbers are generated to serve as the random sequence, and a plurality of original characters are fetched from the original data according to the random numbers to serve as the encryption key.

In an embodiment of the invention, in the step of encrypting the replacing data to obtain the ciphertext, the replacing data and the random sequence are combined to obtain the ciphertext.

In an embodiment of the invention, in the step of combining the replacing data and the random sequence to obtain the ciphertext, a number system conversion procedure is performed on the replacing data to obtain a plurality of first conversion codes, and a connection symbol is added between each two of the adjacent first conversion codes to obtain a first ciphertext sequence. Moreover, the number system conversion procedure is also performed on the random sequence to obtain a plurality of random conversion codes, and a connection symbol is respectively added between each two of the adjacent random conversion codes and before and after the random sequence to obtain a second ciphertext sequence. The first ciphertext sequence and the second ciphertext sequence are connected to obtain the ciphertext.

In an embodiment of the invention, the first conversion codes and the random conversion codes are hexadecimal codes, and the connection symbol is one of letters from a $7^{th}$ letter to a $26^{th}$ letter.

In an embodiment of the invention, in the step of encrypting the replacing data to obtain the ciphertext, an encryption procedure is performed on the replacing data to obtain an initial encryption sequence. Then, the initial encryption sequence and the random sequence are combined to obtain the ciphertext.

In an embodiment of the invention, in the step of performing the encryption procedure on the replacing data to obtain the initial encryption sequence, a data inverting procedure is performed on the replacing data to obtain an inverting data sequence, and a circular shift procedure is performed on the inverting data sequence to obtain the initial encryption sequence.

In an embodiment of the invention, the step of performing the data inverting procedure on the replacing data to obtain the inverting data sequence includes performing a number system conversion procedure on the replacing data to obtain a data conversion sequence, where the data conversion sequence includes a plurality of second conversion codes; performing the number system conversion procedure on the encryption key to obtain a key conversion sequence, where the key conversion sequence includes a plurality of random conversion codes, and each of the random conversion codes includes a plurality of bits; respectively determining whether each bit is a specified value to obtain representative referential numbers of the bits having the specified value, so as to obtain an inverting reference sequence; inverting one of the second conversion codes in the data conversion sequence corresponding to the representative referential number one-by-one according to the representative referential numbers in the inverting reference sequence, so as to obtain the inverting data sequence.

In an embodiment of the invention, the inverting data sequence includes a plurality of inverting codes, and the step of performing the circular shift procedure on the inverting data sequence to obtain the initial encryption sequence includes circularly left shifting each of the inverting codes to obtain the initial encryption sequence.

In an embodiment of the invention, the step of combining the initial encryption sequence with the random sequence to obtain the ciphertext includes performing a number system conversion procedure on the initial encryption sequence to obtain a plurality of third conversion codes, and adding a connection symbol between each two of the adjacent third conversion codes to obtain a first ciphertext sequence; performing the number system conversion procedure on the random sequence to obtain a plurality of random conversion codes, and adding a connection symbol between each two of the adjacent random conversion codes and before and after the random sequence to obtain a second ciphertext sequence; and connecting the first ciphertext sequence and the second ciphertext sequence to obtain the ciphertext.

The invention provides an electronic apparatus including a storage unit and a processing unit. The storage unit includes a ciphertext database, and the processing unit is coupled to the storage unit. Moreover, the processing unit drives a plurality of modules. The modules include a key obtaining module and an encryption module. The key obtaining module obtains an encryption key from original data according to a random sequence. The encryption module transforms the original data into replacing data by using the encryption key, and encrypts the replacing data to obtain a ciphertext, and stores the ciphertext in the ciphertext database.

The invention provides a data verification method, which is adapted to an electronic apparatus. In the method, original data is received, and the original data is encrypted into a ciphertext, and the ciphertext is stored. Then, verification data is received, and a decryption key is obtained from the verification data, and the stored ciphertext is decrypted by using the decryption key, so as to obtain decryption data. When the decryption data is conformed with the verification data, the verification data is determined to be correct, i.e. the verification data is the original data. When the decryption data is not conformed with the verification data, the verification data is determined to be incorrect, i.e. the verification data is not the original data. The step of encrypting the original data into the ciphertext includes following steps: an encryption key is obtained from the original data according to a random sequence, the original data is transformed into replacing data by using the encryption key, and the replacing data is encrypted to obtain the ciphertext.

According to the above descriptions, the encryption key is ameliorated to be randomly correlated with the original data, so that each time the encryption key is randomly changed, so as to enhance reliability and security of the ciphertext. In this way, even if the encryption method is leaked, when the decryption is performed without the original data, the ciphertext cannot be deciphered.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9 is a schematic diagram of obtaining an inverting data sequence according to a third embodiment of the invention.

DETAILED DESCRIPTION OF DISCLOSED EMBODIMENTS

First Embodiment

Figure 1:
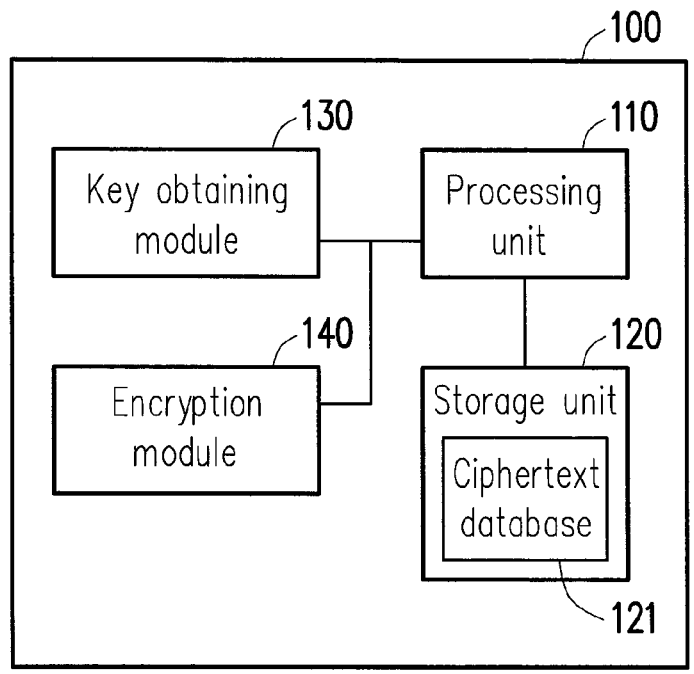
FIG. 1 is a block schematic diagram of an electronic apparatus according to a first embodiment of the invention.

FIG. 1 is a block schematic diagram of an electronic apparatus according to a first embodiment of the invention. Referring to FIG. 1, in the present embodiment, the electronic apparatus 100 includes a processing unit 110 and a storage unit 120. The storage unit 120 includes a ciphertext database 121, and the processing unit 110 is coupled to the storage unit 120. Moreover, the processing unit 110 drives a plurality of modules. The modules include a key obtaining module 130 and an encryption module 140.

The key obtaining module 130 obtains an encryption key from original data according to a random sequence. Then, the encryption module 130 transmits the encryption key to the encryption module 140 for utilization.

The encryption module 140 transforms the original data into replacing data by using the encryption key, and encrypts the replacing data to obtain a ciphertext. Then, the encryption module 140 stores the ciphertext in the ciphertext database 121.

Figure 2:
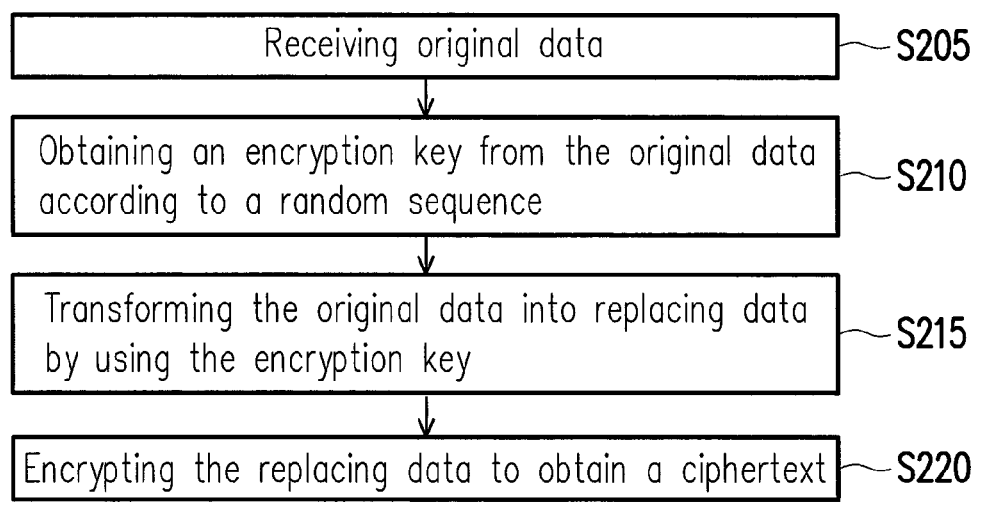
FIG. 2 is a flowchart illustrating a data encryption method according to the first embodiment of the invention.

A data encryption method is described below in collaboration with the aforementioned electronic apparatus 100. FIG. 2 is a flowchart illustrating a data encryption method according to the first embodiment of the invention. Referring to FIG. 1 and FIG. 2, in step S205, the electronic apparatus 100 receives original data.

Then, in step S210, the electronic apparatus 100 obtains an encryption key from the original data according to a random sequence. For example, the electronic apparatus 100 obtains M random numbers to serve as the random sequence through the key obtaining module 130, and fetches a plurality of original characters from the original data according to the random numbers to serve as the encryption key.

It is assumed that the original data is "ABCDEFGHIJK", which includes 11 original characters, and the original characters are sequentially numbered from 0 to 10. Here, it is assumed that 4 random numbers are obtained to serve as the random sequence. The key obtaining module 130 is used to randomly fetch 4 random numbers from 0 to 10, for example, (5, 8, 2, 7). Then, the key obtaining module 130 correspondingly fetches a plurality of original characters from the original data according to the above random numbers to serve as the encryption key.

For example, the first random number is 5, and 6 original characters "ABCDEF" with referential numbers of 0-5 are fetched from the original data; the second random number is 8, and 9 original characters "ABCDEFGHI" with referential numbers of 0-8 are fetched from the original data; the third random number is 2, and 3 original characters "ABC" with referential numbers of 0-2 are fetched from the original data; and the fourth random number is 7, and 8 original characters "ABCDEFGH" with referential numbers of 0-7 are fetched from the original data. Therefore, the encryption key obtained by the key obtaining module 130 is "ABCDEFABCDEFGHI-ABCABCDEFGH".

Alternatively, the original characters with the referential numbers of 5, 8, 2 and 7 can be directly fetched to serve as the encryption key, etc., and how to obtain the encryption key from the original data by using the random sequence is determined according to a required key complexity, and the above methods are only used as examples, which are not used to limit the invention.

After the encryption key is obtained, in step S215, the electronic apparatus 100 transforms the original data into replacing data by using the encryption key. For example, the characters in the encryption key are used to replace the original data.

A replacing algorithm is provided below to describe how the encryption module 140 uses the encryption key to transform the original data into the replacing data. For example, the encryption module 140 first inverts the encryption key to obtain an inverting key, and then sequentially and alternately fetches characters from the inverting key and the encryption key to replace the original characters in the original data.

Figure 3:
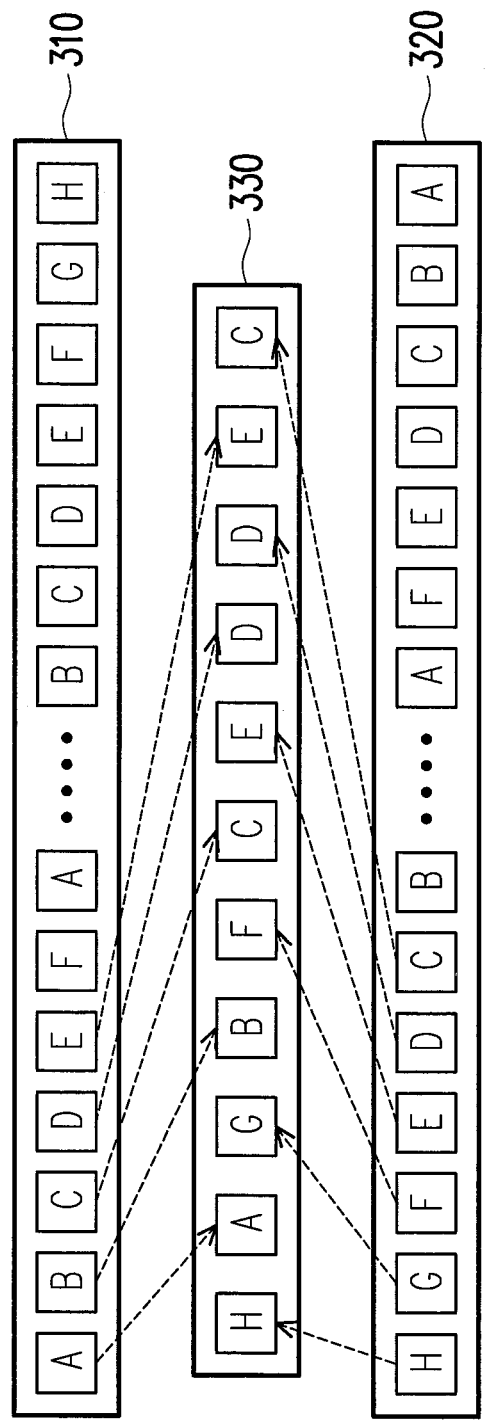
FIG. 3 is a schematic diagram of transforming original data into replacing data according to the first embodiment of the invention.

For example, FIG. 3 is a schematic diagram of transforming the original data into the replacing data according to the first embodiment of the invention. Referring to FIG. 3, in the present embodiment, the original data is, for example, "ABCDEFGHIJK", and it is assumed that the random sequence is (5, 8, 2, 7). An encryption key 310 is obtained according to the original data and the random sequence, i.e.:

"ABCDEFABCDEFGHIABCABCDEFGH".

By inverting the encryption key 310, an inverting key 320 is obtained, i.e.:

"HGFEDCBACBAIHGFEDCBAFEDCBA".

Here, the first character "H" of the inverting key 320 is fetched to replace the first original character, and then the first character "A" of the encryption key 310 is fetched to replace the second original character. Then, the second character "G" of the inverting key 320 is fetched to replace the third original character, and then the second character "B" of the encryption key 310 is fetched to replace the fourth original character, etc., and the others are deduced by analogy, and the characters are alternately fetched from the inverting key 320 and the encryption key 310 to replace the original character, so as to obtain the replacing data 330, i.e. "HAGBFCEDDEC".

Referring to FIG. 2, after the replacing data is obtained, in step S220, the electronic apparatus 100 encrypts the replacing data to obtain a ciphertext. For example, the encryption module 140 combines the replacing data and the random sequence to obtain the ciphertext.

For example, the encryption module 140 performs a number system conversion procedure on the replacing data to obtain a plurality of first conversion codes. For example, the encryption module 140 transforms each of the characters of the replacing data into an American standard code for information interchange (ASCII code), and then transforms it into a binary code, and further transforms it into a hexadecimal code (i.e. the first conversion code). Then, a connection symbol is added between each two of adjacent first conversion codes to obtain a first ciphertext sequence.

Moreover, the encryption module 140 also performs the number system conversion procedure on the random sequence to obtain a plurality of random conversion codes. For example, the encryption module 140 transforms each of the random conversion codes of the random sequence from the decimal code to the hexadecimal code (the random conversion codes). Then, a connection symbol is respectively added between each two of adjacent random conversion codes and before and after the random sequence to obtain a second ciphertext sequence. Then, The first ciphertext sequence and the second ciphertext sequence are connected to obtain the ciphertext.

Figure 4:
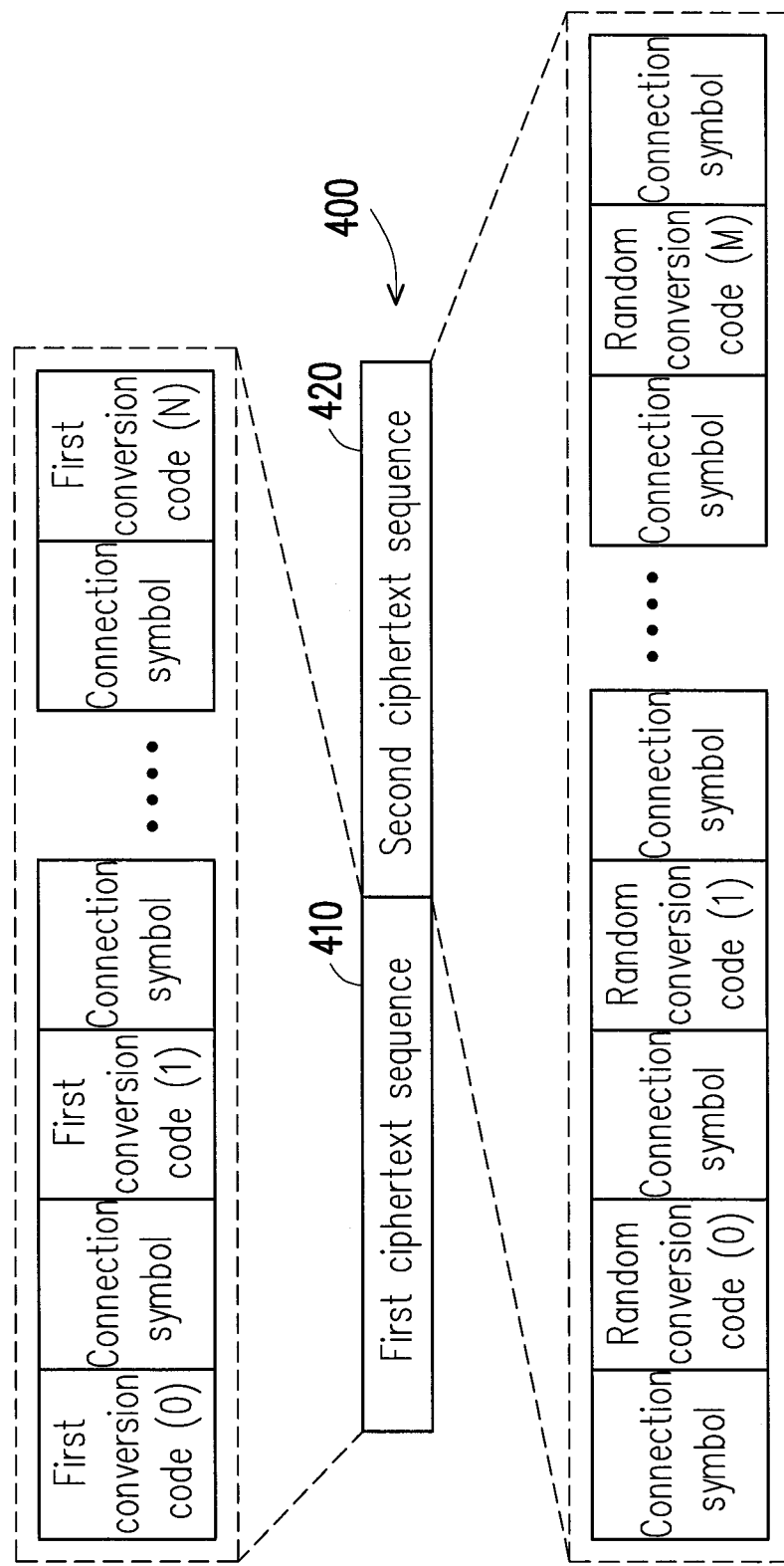
FIG. 4 is a schematic diagram of combining replacing data and a random sequence according to the first embodiment of the invention.

FIG. 4 is a schematic diagram of combining the replacing data and the random sequence according to the first embodiment of the invention. Referring to FIG. 4, the ciphertext 400 is composed of a first ciphertext sequence 410 and a second ciphertext sequence 420. The first ciphertext sequence 410 includes N first conversion codes obtained from the replacing data, and two adjacent first conversion codes have a connection symbol there between. The second ciphertext sequence 420 includes M random conversion codes obtained from the random sequence, and besides that two adjacent random conversion codes have a connection symbol there between, the connection symbol is also added before and after the random sequence.

Here, since the first conversion codes and the random conversion codes are all hexadecimal codes, the connection symbol is, for example, a letter not used in the hexadecimal codes, i.e. one of the letters from the $7^{th}$ letter to the $26^{th}$ letter (letters g-z, no distinguish of uppercase and lowercase).

Moreover, the electronic apparatus 100 can also deciphers the ciphertext, which is described below.

Figure 5:
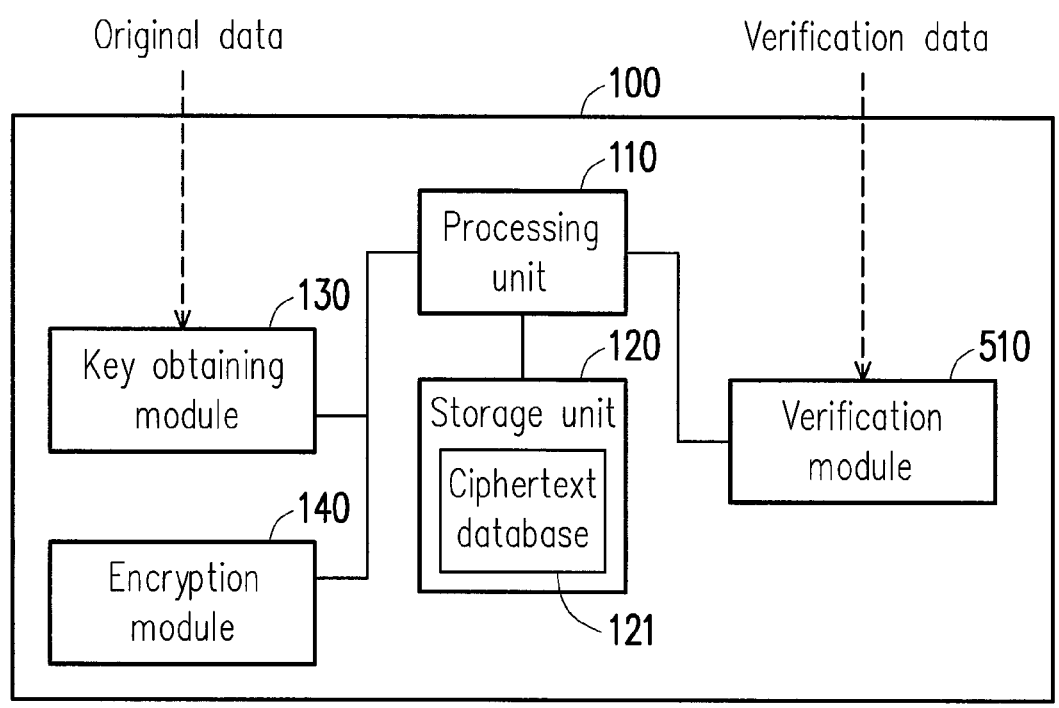
FIG. 5 is a block diagram of another electronic apparatus according to the first embodiment of the invention.

FIG. 5 is a block diagram of another electronic apparatus according to the first embodiment of the invention. Referring to FIG. 5, components with referential numbers the same to that of FIG. 1 have the same functions as that described with reference of FIG. 1, which are not repeated. In FIG. 5, the electronic apparatus 100 further includes a verification module 510, which is used to verify whether received verification data is correct.

After the verification module 140 receives the verification data, the verification module 140 obtains a decryption key from the verification data, and decrypts the ciphertext stored in the ciphertext database 121 by using the decryption key. If decryption data obtained by decrypting the above ciphertext is conformed with the verification data, it is determined that the verification data is the original data.

Moreover, in an actual application, the key obtaining module 130, the encryption module 140 and the verification module 510 can be software written in a programming language (which can be stored in the storage unit 120), or an independent chip formed by one or a plurality of logic circuits, which is not limited by the invention.

Figure 6:
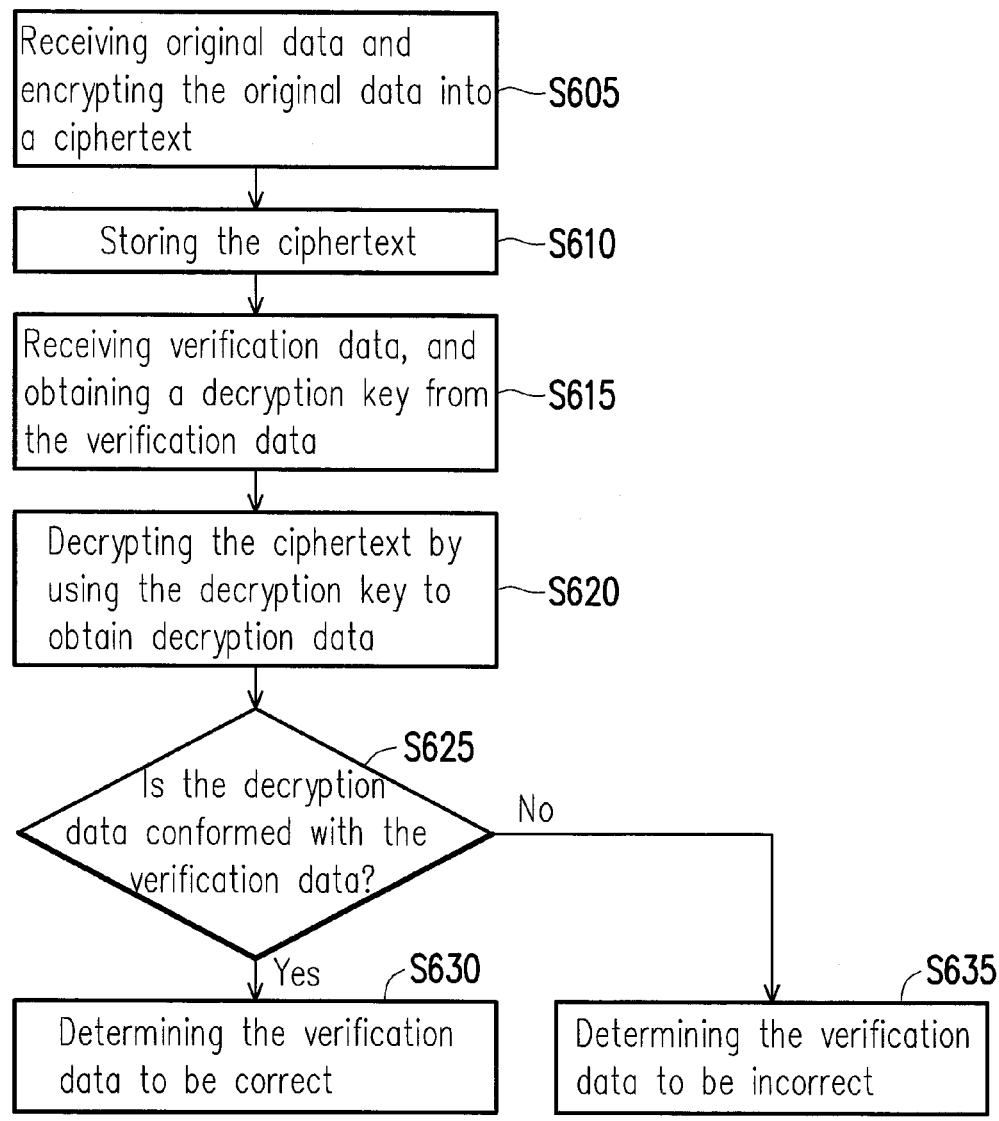
FIG. 6 is a flowchart illustrating a data verification method according to the first embodiment of the invention.

FIG. 6 is a flowchart illustrating a data verification method according to the first embodiment of the invention. Referring to FIG. 5 and FIG. 6, in step S605, the original data is received, and the original data is encrypted into a ciphertext. For example, the step S605 includes the steps S210-S220. After the original data is encrypted, in step S610, the ciphertext is stored in the ciphertext database 121.

Then, in step S615, verification data is received, and a decryption key is obtained from the verification data through the verification module 510. Moreover, the verification module 510 obtains the ciphertext from the ciphertext database 121, and in step S620, the verification module 510 decrypts the ciphertext by using the decryption key.

Referring the example of FIG. 4, when the verification module 510 receives the verification data, it obtains the ciphertext from the ciphertext database 121, and decomposes the ciphertext into the replacing data and the random sequence. For example, a plurality of first conversion codes and a plurality of random conversion codes are separated through the connection symbols. When the random sequence is produced, the verification module 510 can also learn a length M of the random sequence. Therefore, the verification module 510 can fetch M random conversion codes from back to forth according to the length M of the random sequence, and the remained values are the first conversion codes.

Then, the verification module 510 transforms the random conversion codes into decimal codes through the number system conversion procedure, so as to obtain the random sequence, and performs the number system conversion procedure on the first conversion codes to obtain the replacing data. Then, the verification module 510 obtains a decryption key from the verification data according to the random sequence, and a process thereof is similar to the step S210. Then, the replacing data is decrypted by using the decryption key to obtain the decryption data.

Then, in step S625, the verification module 510 determines whether the decryption data is the same to the verification data. If yes, in step S630, it is determined that the verification data is correct, i.e. the verification data is the original data. Conversely, if the decryption data is different to the verification data, in step S635, it is determined that the verification data is incorrect, i.e. the verification data is different to the original data.

In this way, according to the above data verification method, when the decryption is performed, the original data has to be obtained in order to decipher the ciphertext, otherwise, regardless whether the electronic device 100 grasps the encryption/decryption technique, it cannot decipher the ciphertext. The above embodiment can be implemented in a user side or a server side, which is determined according to an actual application. Several examples are provided below to describe applications of the above data encryption method and data verification method.

The above data encryption method and data verification method can be applied to encrypt user data of software or a business website, so as to prevent the user data from being stolen or used by others. The user data is, for example, passwords, ID card numbers, and financial accounts, etc. The method is as follows. The electronic apparatus 100 serves as a server device of the website, and the electronic apparatus 100 encrypts the user data to obtain a ciphertext, and stores the ciphertext in the database. In this case, unless owning the original data, the ciphertext cannot be deciphered by any means. During interactive authentication between the user and the website, the verification data is used to decrypt the ciphertext, and if the decryption data is conformed with the verification data, it is determined that the verification data is the correct original data, and an authentication success result is fed back to the user, and if the decryption data is not conformed with the verification data, it is determined that the verification data is error data, and an authentication failure result is fed back to the user. In this way, high security of the user data stored in the electronic apparatus 100 is guaranteed.

The above data encryption method and data verification method can also be applied to security encryption of an electronic door lock, and a method thereof is as follows. The electronic apparatus 100 serves the electronic door lock, and a door lock password input by the user is taken as the original data. The door lock password is encrypted and saved in the electronic door lock. When the user inputs the correct door lock password, the authentication is successful and the electronic door lock is activated, and when the user inputs an error door lock password, the authentication is failed, and activation of the electronic door lock is failed. In this way, the encrypted door lock password stored in the electronic door lock is protected.

The above data encryption method and data verification method can also be applied to encryption of a data transmission signal or a data transmission method, and the method thereof is as follows. Before the transmission, a transmitter encrypts the data transmission signal or the data transmission method to obtain a ciphertext, and transmits the ciphertext to a recipient. Now, the recipient cannot obtain a detailed content of the data transmission signal or the data transmission method. When the transmission is started, transmitter transmits a signal text to the recipient, and the recipient decrypts the above ciphertext (i.e. the encrypted data transmission signal or data transmission method) by using the received signal text, and determines whether the obtained data is conformed with the received signal text, so as to determine whether or not to start transmitting data.

The above data encryption method and data verification method can also be applied to encryptions of data exchange, etc., that requires ID authentication of both sides, and a method thereof is as follow. Both sides confirm a shared key (for example, a data file name), and both sides respectively encrypt such key to obtain two sets of different ciphertexts, and during data exchange, the two sides exchange the ciphertexts and perform decryption by using the shared key. If a decryption content obtained by one side is conformed with the shared key, the data exchange is agreed, and if the decryption content is not conformed with the shared key, the data exchange is refused.

According to the above descriptions, the encryption key is ameliorated to be randomly correlated with the original data, so that each time the encryption key is randomly changed, so as to enhance reliability and security of the ciphertext. In this way, even if the encryption method is leaked, when the decryption is performed without the original data, the ciphertext cannot be deciphered.

Moreover, in order to enhance security, the encryption process can be complicated, and another embodiment is provided below for descriptions.

Second Embodiment

In the present embodiment, the encryption method of the first embodiment is taken as a basis, and the encryption process thereof is further complicated to enhance security.

Figure 7:
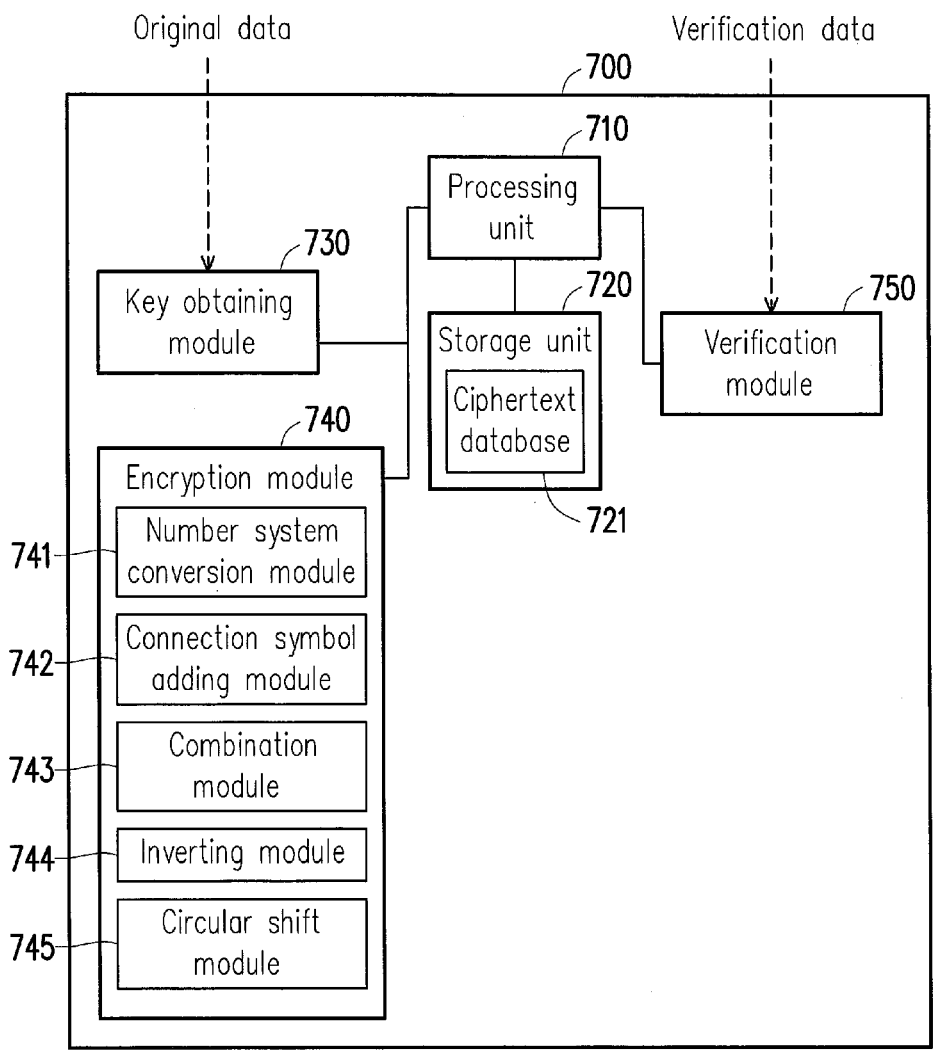
FIG. 7 is a block diagram of an electronic apparatus according to a second embodiment of the invention.

FIG. 7 is a block diagram of an electronic apparatus according to the second embodiment of the invention. Referring to FIG. 7, the electronic apparatus 700 includes a processing unit 710 and a storage unit 720. The storage unit 720 includes a ciphertext database 721, and the processing unit 710 is coupled to the storage unit 720. Moreover, the processing unit 710 drives a plurality of modules. The modules include a key obtaining module 730, an encryption module 740 and a verification module 750. Moreover, the encryption module 740 further includes a number system conversion module 741, a connection symbol adding module 742, a combination module 743, an inverting module 744 and a circular shift module 745. In the present embodiment, the key obtaining module 710 and the verification module 750 are the same or similar to the key obtaining module 110 and the verification module 510 of the first embodiment, so that details thereof are not repeated.

The number system conversion module 741 is used to execute the number system conversion procedure to, for example, transform a character into an ASCII code, transform the ASCII code into the hexadecimal code, and transform the hexadecimal code into a binary code, etc. The connection symbol adding module 742 is used to add the connection symbols in the processed sequence of the replacing data and the random sequence to respectively obtain the first ciphertext sequence and the second ciphertext sequence. The combination module 743 connects the first ciphertext sequence and the second ciphertext sequence to obtain the final ciphertext.

Moreover, the inverting module 744 is used to perform a data inverting procedure (for example, 2's complement) on the replacing data to obtain the inverting data sequence. The circular shift module 745 performs a circular shift procedure on the inverting data sequence to obtain an initial encryption sequence.

Figure 8:
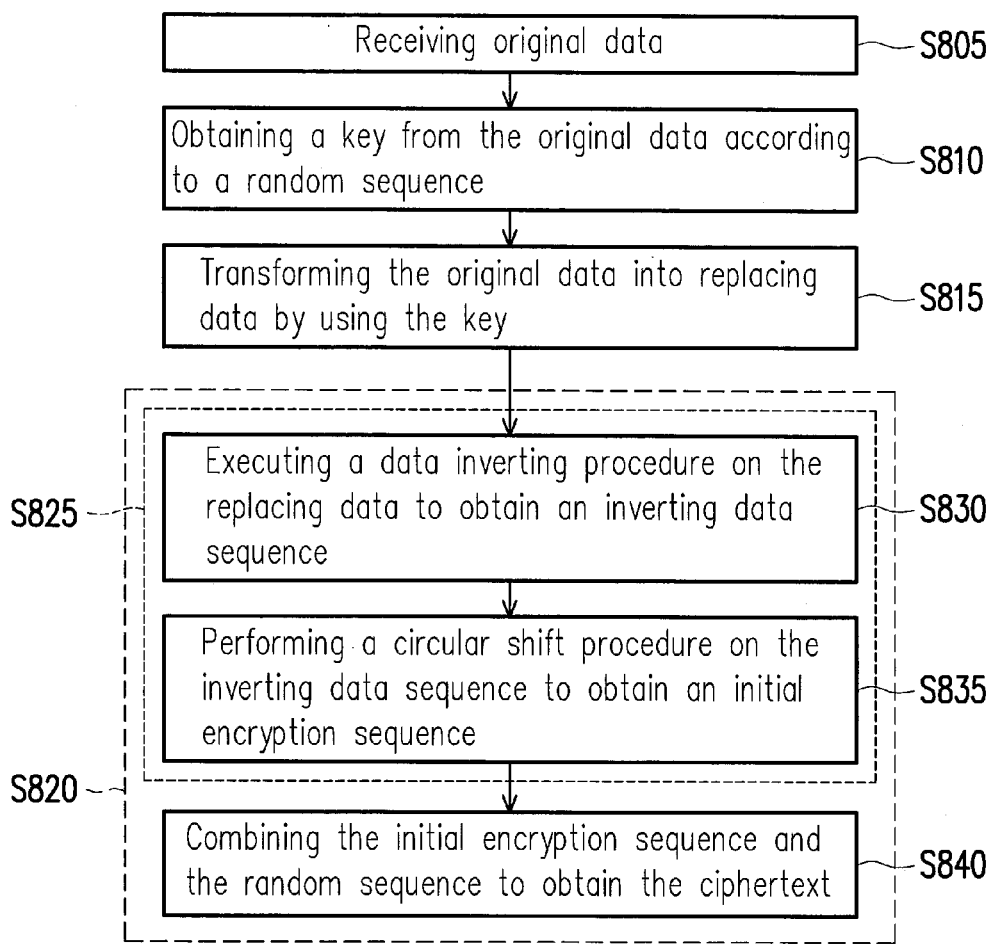
FIG. 8 is a flowchart illustrating a data encryption method according to the second embodiment of the invention.

The data encryption flow is further described below in collaboration with the aforementioned electronic apparatus 700. FIG. 8 is a flowchart illustrating a data encryption method according to the second embodiment of the invention. Referring to FIG. 7 and FIG. 8, in step S805, the electronic apparatus 700 receives original data. Then, in step S810, the key obtaining module 730 obtains an encryption key from the original data according to a random sequence. Then, in step S815, the electronic apparatus 700 transforms the original data into replacing data by using the encryption key. In the present embodiment, the steps S805-S815 are the same or similar to the steps S205-S215, and details thereof are not repeated.

After the replacing data is obtained, in step S820, the electronic apparatus 100 encrypts the replacing data to obtain a ciphertext through the encryption module 740. In the present embodiment, in order to enhance security, the step S820 further includes a step S825 and a step S840. In the step S825, the encryption module 740 further executes an encryption procedure on the replacing data to obtain an initial encryption sequence. In the step S840, the encryption module 740 combines the initial encryption sequence and the random sequence to obtain the ciphertext.

Moreover, the aforementioned encryption procedure can also be omitted, and the replacing data and the random sequence are combined to obtain the ciphertext. As shown in FIG. 4 of the first embodiment, the number system conversion module 741 performs the number system conversion procedure on the replacing data to obtain a plurality of the first conversion codes, and performs the number system conversion procedure on the random sequence to obtain a plurality of the random conversion codes. Moreover, the connection symbol adding module 742 adds one of the connection symbols between each two of the adjacent first conversion codes to obtain the first ciphertext sequence 410, and adds a connection symbol between each two of the adjacent random conversion codes and before and after the random sequence to obtain the second ciphertext sequence 420. Then, the combination module 743 connects the first ciphertext sequence 410 and the second ciphertext sequence 420 to obtain the ciphertext 400.

In the present embodiment, in order to enhance security of the ciphertext, in step the S825, the encryption module 740 further executes an encryption procedure. Here, the encryption procedure includes a step S830 and a step S835. However, in other embodiments, the encryption procedure can be any existing encryption algorithm, which is not limited by the invention.

In the step S830, the inverting module 744 performs a data inverting procedure on the replacing data to obtain an inverting data sequence. In the step S835, the circular shift module 745 performs a circular shift procedure on the inverting data sequence to obtain an initial encryption sequence.

Further, the number system conversion module 741 respectively performs the number system conversion procedure on the replacing data and the encryption key to respectively obtain a data conversion sequence and a key conversion sequence. Here, the data conversion sequence includes a plurality of second conversion codes, the key conversion sequence includes a plurality of key conversion codes, and each of the key conversion codes includes a plurality of bits. The inverting module 744 respectively determines whether each bit of each of the key conversion codes is a specified value (for example, 1) to obtain representative referential numbers of the bits having the value of 1, so as to obtain an inverting reference sequence, and inverts the second conversion codes in the data conversion sequence corresponding to the representative referential numbers one-by-one according to the representative referential numbers in the inverting reference sequence, so as to obtain the inverting data sequence.

For example, it is assumed that the original data is "ABCDEFGHIJK", the random sequence is (5, 8, 2, 7), and the encryption key obtained by the key obtaining module 130 is "ABCDEFABCDEFGHIABCABCDEFGH". Moreover, it is assumed that the replacing data is "HAGBFCEDDEC".

The number system conversion module 741 transforms the replacing data "HAGBFCEDDEC" to ASCII codes (72, 65, 71, 66, 70, 67, 69, 68, 68, 69, 67), and further transforms the ASCII codes to binary codes (the second conversion codes), so as to obtain a data conversion sequence (1001000, 1000001, 1000111, 1000010, 1000110, 1000011, 1000101, 1000100, 1000100, 1000101, 1000011), and referential numbers of these second conversion codes are 0-10.

Figure 9:
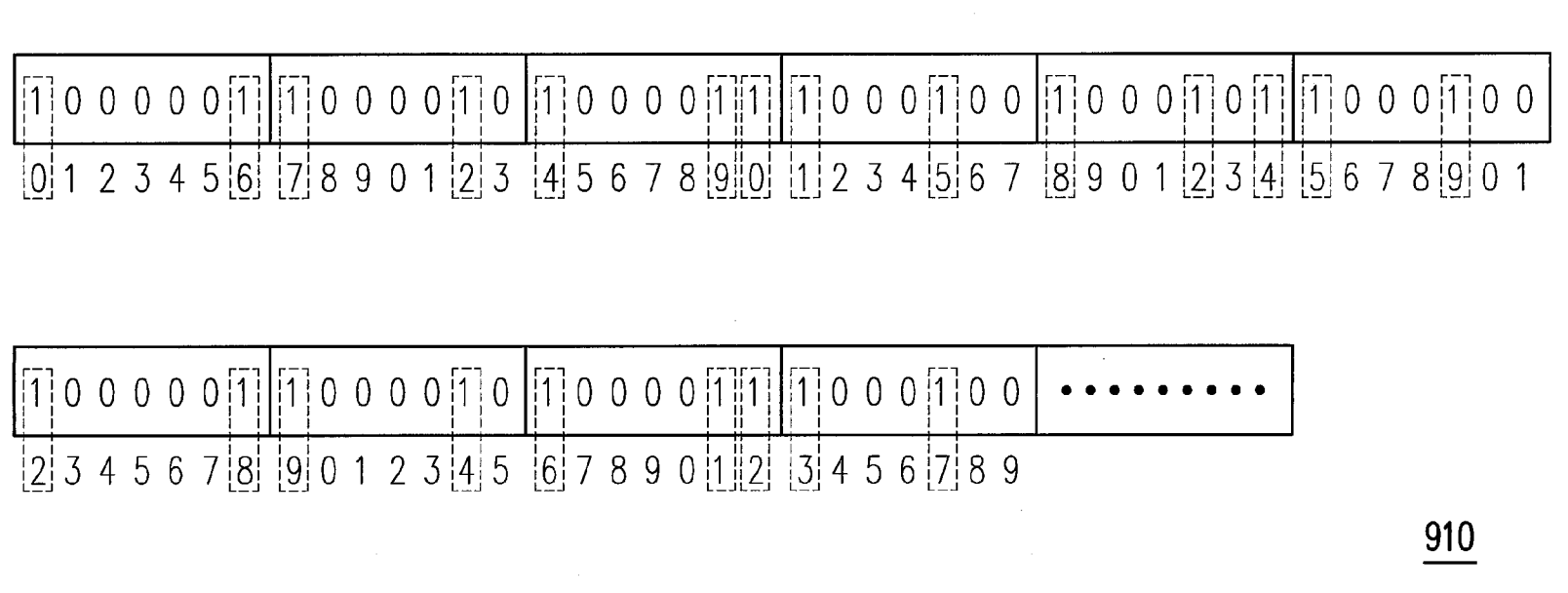

Moreover, the number system conversion module 741 transforms the characters in the encryption key to the ASCII codes, and further transforms the ASCII codes into the binary codes (i.e. the key conversion codes), so as to obtain the key conversion sequence (1000001, 1000010, 1000011, 1000100, 1000101, 1000110, 1000001, 1000010, 1000011, 1000100, . . . ), shown as a key conversion sequence 910 of FIG. 9.

FIG. 9 is a schematic diagram of obtaining the inverting data sequence according to a third embodiment of the invention. Referring to FIG. 9, each bit of each of the key conversion codes is numbered, and for simplicity's sake, only 0-9 are circularly used to represent the representative referential numbers 0-9, 10-19, 20-29, etc. In the key conversion sequence 910, the inverting module 744 obtains the representative referential numbers of the bits of the key conversion codes having the value of 1, so as to obtain an inverting reference sequence (0, 6, 7, 12, 14, 19, 20, . . . ).

Then, the data inverting procedure is performed on the second conversion codes in the data conversion sequence corresponding to the representative referential numbers one-by-one according to the representative referential numbers in the inverting reference sequence. Taking the inverting reference sequence (0, 6, 7, 12, 14, 19, 20, . . . ) as an example, the first representative referential number of the inverting reference sequence is 0, and in the data conversion sequence, the second conversion code (1001000) corresponding to the referential number 0 is inverted to obtain an inverting code (0110111). Then, the second representative referential number of the inverting reference sequence is 6, and in the data conversion sequence, the second conversion code (1000101) corresponding to the referential number 6 is inverted to obtain an inverting code (0111010). The third representative referential number of the inverting reference sequence is 7, and in the data conversion sequence, the second conversion code (1000100) corresponding to the referential number 7 is inverted to obtain an inverting code (0111011). The others are deduced by analogy until the second conversion codes corresponding to all of the representative referential numbers in the inverting reference sequence are inverted.

It should be noticed that the fourth representative referential number in the inverting reference sequence is 12, and since the data conversion sequence of this example only includes 11 second conversion codes with the referential numbers of 0-10, if a value of the representative referential number in the inverting reference sequence exceeds the number of the second conversion codes, a start place is returned for recounting. Here, the representative referential number in the inverting reference sequence is 12, and the data inverting procedure is performed on the second conversion code (1000001) corresponding to the referential number 1 in the data conversion sequence to obtain an inverting code (0111110). Moreover, when the start place is returned for recounting as the value of the representative referential number in the inverting reference sequence exceeds the number of the second conversion codes, it is discovered that the data inverting procedure has ever been performed on the corresponding second conversion code before, the data inverting procedure is again performed.

For simplicity's sake, it is assumed that the inverting reference sequence is (0, 6, 7, 12, 14, 19, 20), by performing the data inverting procedure on the data conversion sequence (1001000, 1000001, 1000111, 1000010, 1000110, 1000011, 1000101, 1000100, 1000100, 1000101, 1000011), an inverting data sequence (0110111, 0111110, 1000111, 0111101, 1000110, 1000011, 0111010, 0111011, 0111011, 0111010, 1000011) is obtained.

Then, the circular shift module 745 performs the circular shift procedure on the above inverting data sequence to obtain the initial encryption sequence. For example, the circular shift module 745 circularly left shifts each of the inverting codes to obtain the initial encryption sequence. Taking the inverting code "0110111" with the referential number of 0 as an example, "1101110" is obtained after the circular left shift. After each of the inverting codes in the inverting data sequence is circularly left shifted, the initial encryption sequence (1101110, 1111100, 0001111, 1111010, 0001101, 0000111, 1110100, 1110110, 1110110, 1110100, 0000111) is obtained.

After the initial encryption sequence is obtained, the number system conversion module 741 respectively performs the number system conversion procedure on the initial encryption sequence and the random sequence to obtain a plurality of third conversion codes and a plurality of random conversion codes. For example, the initial encryption sequence is transformed from the binary codes into the hexadecimal codes (the third conversion codes), and the third conversion codes are sequentially (6e, 7c, 5, 7a, d, 7, 74, 76, 76, 74, 7). Moreover, the connection symbol adding module 742 respectively adds a connection symbol between each two of the adjacent third conversion codes to obtain a first ciphertext sequence. For example, the first ciphertext sequence is (6e, g, 7c, p, 5, q, 7a, I, d, h, 7, j, 74, L, 76, n, 76, w, 74, y, 7).

Moreover, after the initial encryption sequence is obtained, the number system conversion module 741 performs the number system conversion procedure on the random sequence (5, 8, 2, 7) to obtain a plurality of random conversion codes, for example, transformed into the hexadecimal codes. Theses random conversion codes are sequentially (5, 8, 2, 7). Then, a connection symbol is respectively added between each two of the adjacent random conversion codes and before and after the random sequence to obtain a second ciphertext sequence. For example, the second ciphertext sequence is (Z, 5, h, 8, m, 2, o, 7, x).

Finally, the combination module 743 connects the first ciphertext sequence and the second ciphertext sequence to obtain the ciphertext, for example, (6e, g, 7c, p, f, q, 7a, I, d, h, 7, j, 74, L, 76, n, 76, w, 74, y, 7, Z, 5, h, 8, m, 2, o, 7, x). Here, the connecting method of the first ciphertext sequence and the second ciphertext sequence is (the first ciphertext sequence, the second ciphertext sequence) as that shown in FIG. 4 of the first embodiment, though in other embodiments, it can also be (the second ciphertext sequence, the first ciphertext sequence), which is not limited by the invention.

After the ciphertext is obtained, the ciphertext is stored in the ciphertext database 721, and when the electronic apparatus 700 receives the verification data, the ciphertext is fetched from the ciphertext database 721 to execute the data verification method.

Taking the ciphertext (6e, g, 7c, p, f, q, 7a, I, d, h, 7, j, 74, L, 76, n, 76, w, 74, y, 7, Z, 5, h, 8, m, 2, o, 7, x) as an example, since the connection symbols are letters not appeared in the hexadecimal, the letters (g-z, no distinguish of uppercase and lowercase) in the ciphertext that are not appeared in the hexadecimal are picked out to obtain (6e, 7c, f, 7a, d, 7, 74, 76, 76, 74, 7, 5, 8, 2, 7). Since when the random sequence (5, 8, 2, 7) is generated, the verification module 750 learns that the length of the random sequence is 4, the verification module 750 can fetch 4 random conversion codes of the hexadecimal from back to forth according to the length 4 of the random sequence, so as to obtain (5, 8, 2, 7), and the remained hexadecimal values are the aforementioned third conversion codes (6e, 7c, f, 7a, d, 7, 74, 76, 76, 74, 7).

Then, the third conversion codes (6e, 7c, f, 7a, d, 7, 74, 76, 76, 74, 7) are transformed into binary codes to obtain the initial encryption sequence (1101110, 1111100, 0001111, 1111010, 0001101, 0000111, 1110100, 1110110, 1110110, 1110100, 0000111). Then, each of the conversion codes in the initial encryption sequence is circularly right shifted to obtain the inverting data sequence (0110111, 0111110, 1000111, 0111101, 1000110, 1000011, 0111010, 0111011, 0111011, 0111010, 1000011). Moreover, the random conversion codes are transformed into decimal codes to obtain the random sequence (5, 8, 2, 7).

The key obtaining module 730 obtains a decryption key from the verification data according to the random sequence (5, 8, 2, 7). Then, the inverting module 744 executes the data inverting procedure by using the decryption key, so as to obtain the inverting reference sequence used for verification. Moreover, the inverting reference sequence used for verification is used to invert the inverting data sequence to obtain the replacing data used for decryption. Then, the decryption data is obtained according to the replacing data used for decryption. In this way, by comparing the decryption data with the verification data, it is determined whether the verification data is correct.

The above embodiments can be applied to encryptions of data exchange, etc., that requires ID authentication of both sides, such as encryption of user data (for example, password, ID number, financial account, etc.) of software or a business website, and encryption of a data transmission signal or a data transmission method, etc.

In summary, in the aforementioned embodiment, a set of random sequence is randomly generated, and the random sequence is used to process the original data to be encrypted, which includes obtaining the encryption key (random single key) used for post encryption from the original data, and using the encryption key to transform the original data into the replace data, and encrypting the replacing data (for example, encrypt the replacing data and the random sequence) to form the final ciphertext. Regarding obtaining of the encryption key, it can be obtained by intercepting or replacing the original data, or by using other algorithms, so that the encryption key is correlated with the original data. Since the encryption key is correlated with the original data, after the ciphertext is obtained, the ciphertext cannot be successfully deciphered without the original data.

In this way, the user data (for example, data such as a password, an ID number, or a bank card number, etc., that is only used to verify correctness, and do not want other people to learn besides the user) can be effectively protected, and even if the ciphertext and the decryption method are all leaked, the ciphertext still has a high security, and cannot be decrypted or deciphered.

Moreover, a correlation means of the encryption key and the original data is random, and the encrypted ciphertext has a characteristic of stream cipher. Even the same original data is encrypted, the ciphertexts obtained by different users are almost non-repeated, and after these non-repeated ciphertexts are correctly decrypted, the same original data is obtained. Therefore, the invention can be applied to applications such as exchange of ID authentication of multiple parties, etc.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data encryption method, adapted to an electronic apparatus, the data encryption method comprising:
    receiving an original data by a processing unit of the electronic apparatus;
    obtaining an encryption key from the original data according to a random sequence by the processing unit;
    transforming the original data into a replacing data according to the encryption key by the processing unit; and
    combining the replacing data with the random sequence to obtain a ciphertext by the processing unit, comprising:
    performing a numeral system conversion procedure on the replacing data to obtain a plurality of first conversion codes by the processing unit;
    respectively adding one of a plurality of connection symbols between two of the adjacent first conversion codes to obtain a first ciphertext sequence by the processing unit;
    performing the numeral system conversion procedure on the random sequence to obtain a plurality of random conversion codes by the processing unit;
    respectively adding one of the connection symbols between two of the adjacent random conversion codes, adding one of the connection symbols in a beginning of the random sequence and adding one of the connection symbols in an end of the random sequence by the processing unit, so as to obtain a second ciphertext sequence; and
    combining the first ciphertext sequence with the second ciphertext sequence to obtain the ciphertext by the processing unit.

2. The data encryption method as claimed in claim 1, wherein the step of obtaining the encryption key from the original data according to the random sequence by the processing unit comprises:
    generating a plurality of random numbers by the processing unit, so as to serve as the random sequence; and
    capturing a plurality of original characters from the original data according to the random numbers to serve as the encryption key by the processing unit.

3. The data encryption method as claimed in claim 1, wherein the first conversion codes and the random conversion codes are hexadecimal codes, and the connection symbols include letters from a $7^{th}$ letter to a $26^{th}$ letter.

4. The data encryption method as claimed in claim 1, wherein the step of encrypting the replacing data to obtain the ciphertext by the processing unit comprises:
    performing an encryption procedure on the replacing data to obtain an initial encryption sequence by the processing unit; and
    combining the initial encryption sequence with the random sequence to obtain the ciphertext by the processing unit.

5. The data encryption method as claimed in claim 4, wherein the step of performing the encryption procedure on the replacing data to obtain the initial encryption sequence by the processing unit comprises:
    performing a data inverting procedure on the replacing data to obtain an inverting data sequence by the processing unit; and
    performing a circular shift procedure on the inverting data sequence to obtain the initial encryption sequence by the processing unit.

6. The data encryption method as claimed in claim 5, wherein the step of performing the data inverting procedure on the replacing data to obtain the inverting data sequence by the processing unit comprises:
    performing a numeral system conversion procedure on the replacing data to obtain a data conversion sequence by the processing unit, wherein the data conversion sequence comprises a plurality of second conversion codes;
    performing the numeral system conversion procedure on the encryption key to obtain a key conversion sequence by the processing unit, wherein the key conversion sequence comprises a plurality of random conversion codes, and each of the random conversion codes comprises a plurality of bits;
    determining whether each bit is a specified value to obtain representative referential numbers of the bits having the specified value by the processing unit, so as to obtain an inverting reference sequence; and
    inverting one of the second conversion codes in the data conversion sequence corresponding to the representative referential number one-by-one according to the representative referential numbers in the inverting reference sequence by the processing unit, so as to obtain the inverting data sequence.

7. The data encryption method as claimed in claim 5, wherein the inverting data sequence comprises a plurality of inverting codes, and the step of performing the circular shift procedure on the inverting data sequence to obtain the initial encryption sequence comprises:
    circularly left shifting each of the inverting codes to obtain the initial encryption sequence by the processing unit.

8. The data encryption method as claimed in claim 4, wherein the step of combining the initial encryption sequence with the random sequence to obtain the ciphertext by the processing unit comprises:
performing a numeral system conversion procedure on the initial encryption sequence to obtain a plurality of third conversion codes by the processing unit;
respectively adding one of a plurality of connection symbols between two of the adjacent third conversion codes to obtain a first ciphertext sequence by the processing unit;
performing the numeral system conversion procedure on the random sequence to obtain a plurality of random conversion codes by the processing unit;
respectively adding one of the connection symbols between two of adjacent random conversion codes, adding one of the connection symbols in a beginning of the random sequence and adding one of the connection symbols in an end of the random sequence to obtain a second ciphertext sequence by the processing unit; and
combining the first ciphertext sequence with the second ciphertext sequence to obtain the ciphertext by the processing unit.

9. An electronic apparatus, comprising:
a storage unit, comprising a ciphertext database; and
a processing unit, coupled to the storage unit, and driving a plurality of modules, wherein the modules comprise:
a key obtaining module, obtaining an encryption key from original data according to a random sequence; and
an encryption module, transforming the original data into replacing data according to the encryption key, encrypting the replacing data to obtain a ciphertext, and storing the ciphertext in the ciphertext database,
wherein the encryption module comprises:
a numeral system conversion module, performing a numeral system conversion procedure on the replacing data to obtain a plurality of first conversion codes, and performing the numeral system conversion procedure on the random sequence to obtain a plurality of random conversion codes;
a connection symbol adding module, respectively adding one of a plurality of connection symbols between two of the adjacent first conversion codes to obtain a first ciphertext sequence; and respectively adding one of the connection symbols between two of the adjacent random conversion codes, adding one of the connection symbols in a beginning of the random sequence and adding one of the connection symbols in an end of the random sequence, so as to obtain a second ciphertext sequence; and
a combination module, combining the first ciphertext sequence with the second ciphertext sequence to obtain the ciphertext.

10. The electronic apparatus as claimed in claim 9, wherein the key obtaining module generates a plurality of random numbers, so as to serve as the random sequence, and captures a plurality of original characters from the original data according to the random numbers, so as to serve as the encryption key.

11. The electronic apparatus as claimed in claim 9, wherein the encryption module comprises:
a numeral system conversion module, respectively performing a numeral system conversion procedure on the replacing data and the encryption key to respectively obtain a data conversion sequence and a key conversion sequence, wherein the data conversion sequence comprises a plurality of second conversion codes, and the key conversion sequence comprises a plurality of key conversion codes, and each of the key conversion codes comprises a plurality of bits;
an inverting module, determining whether each bit of each of the random conversion codes is a specified value to obtain representative referential numbers of the bits having the specified value, so as to obtain an inverting reference sequence, and inverting one of the second conversion codes in the data conversion sequence corresponding to the representative referential number one-by-one according to the representative referential numbers in the inverting reference sequence, so as to obtain the inverting data sequence;
a circular shift module, performing a circular shift procedure on the inverting data sequence to obtain the initial encryption sequence, wherein after the initial encryption sequence is obtained, the numeral system conversion module respectively performs a numeral system conversion procedure on the initial encryption sequence and the random sequence to obtain a plurality of third conversion codes and a plurality of random conversion codes;
a connection symbol adding module, adding one of a plurality of connection symbols between two of the adjacent third conversion codes to obtain a first ciphertext sequence; and respectively adding one of the connection symbols between two of adjacent random conversion codes, adding one of the connection symbols in a beginning of the random sequence and adding one of the connection symbols in an end of the random sequence to obtain a second ciphertext sequence; and
a combination module, combining the first ciphertext sequence with the second ciphertext sequence to obtain the ciphertext.

12. The electronic apparatus as claimed in claim 9, wherein the modules further comprise:
a verification module, receiving verification data, obtaining a decryption key from the verification data, and decrypting the ciphertext according to the decryption key, wherein when decryption data obtained by decrypting the ciphertext is conformed with the verification data, the verification data is determined to be the original data.

13. A data verification method, adapted to an electronic apparatus, the data verification method comprising:
receiving original data by a processing unit of the electronic apparatus, and
encrypting the original data into a ciphertext by the processing unit, wherein the step of encrypting the original data into the ciphertext comprises:
obtaining an encryption key from the original data according to a random sequence by the processing unit;
transforming the original data into replacing data according to the encryption key by the processing unit; and
combining the replacing data with the random sequence to obtain the ciphertext by the processing unit, comprising:
performing a numeral system conversion procedure on the replacing data to obtain a plurality of first conversion codes by the processing unit;
respectively adding one of a plurality of connection symbols between two of the adjacent first conversion codes to obtain a first ciphertext sequence by the processing unit;
performing the numeral system conversion procedure on the random sequence to obtain a plurality of random conversion codes by the processing unit;

respectively adding one of the connection symbols between two of the adjacent random conversion codes, adding one of the connection symbols in a beginning of the random sequence and adding one of the connection symbols in an end of the random sequence by the processing unit, so as to obtain a second ciphertext sequence; and combining the first ciphertext sequence with the second ciphertext sequence to obtain the ciphertext by the processing unit;

storing the ciphertext by the processing unit;

receiving verification data, and obtaining a decryption key from the verification data by the processing unit;

decrypting the stored ciphertext based on the decryption key, so as to obtain decryption data by the processing unit;

when the decryption data is conformed with the verification data, determining the verification data to be correct by the processing unit; and when the decryption data is not conformed with the verification data, determining the verification data to be incorrect by the processing unit.

* * * * *